April 25, 1967 E. C. MACK III, ET AL 3,315,380
CEMENTED SHOE AND METHOD OF MAKING THE SAME
Filed Feb. 25, 1963
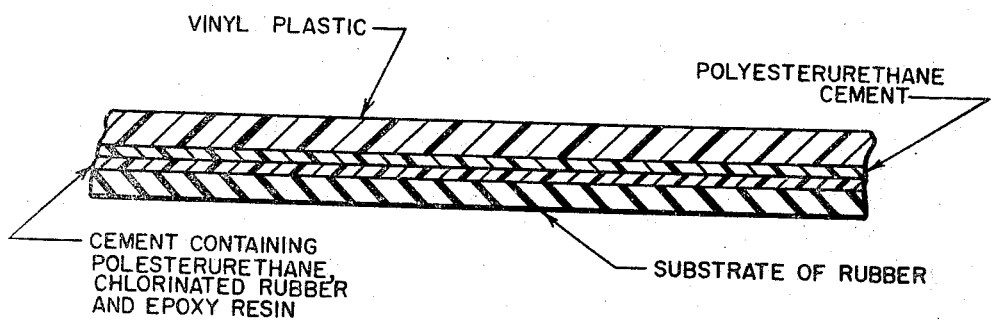

United States Patent Office 3,315,380
Patented Apr. 25, 1967

3,315,380
CEMENTED SHOE AND METHOD OF MAKING THE SAME
Edward C. Mack III, Salem, Denis P. Lynch, Cambridge, Arthur A. Pasqualini, Lynn, and Dino A. Canesi, Arlington, Mass., assignors to Interchemical Corporation, New York, N.Y., a corporation of Ohio
Filed Feb. 25, 1963, Ser. No. 260,821
6 Claims. (Cl. 36—19.5)

This invention relates to cements for bonding vinyl surfaces to other surfaces. More particularly it relates to an effective adhesive for bonding shoe soles to shoe uppers, one of the parts being composed of vinyl.

The cements comprise solutions of essentially linear polyesterurethane elastomers that are very effective in bonding vinyl parts to rubber, or rubber composition parts. In contrast, it was found that various pyroxylin, neoprene, acrylic, butyral, rubber, and acrylonitrile-butadiene cements were unsatisfactory; the bonds were weak, so did not activate properly, and some in addition were subject to plasticizer migration from the vinyl.

For shoes, the bottoms of the uppers and the edges of the soles are roughened and cement is extruded on each of the roughened areas. Only one coating is needed. The coatings are allowed to dry, usually about 2 hours being adequate, but the period may be extended up to about 5 days before making the bond. The coatings are then heated, preferably on a Calrod type unit or the equivalent. This device is similar to an electric stove having horizontal cylindrical elements placed between two grills. The heat is controlled by means of a rheostat. The shoe uppers are placed on the top grill and the soles on the bottom grill, face up. The ambient air temperature is about 150° F. and the surface temperature of the bottoms and soles is held at 110° F. to 160° F. for 10 to 45 seconds. Preferably the surface temperature is held at 120° F. to 130° F. for 30 seconds. The shoe uppers and soles are placed together in a shoe press and subjected to a pressure of 40–60 p.s.i. for about 10–45 seconds, preferably about 15–30 seconds, and the completed shoes are then cooled.

The bonding thus secured is appraised by means of dead load tests. These tests are carried out by making up an assembly of leather or other material of interest adhered to vinyl. The assembly is subjected to a load of 5 lbs. at the interface at a temperature of 105° F. After one hour of this treatment, the creep or separation is measured. Higher temperatures may also be used. A good bond out to show no creep or a negligible degree of it.

The polyesterurethanes used in this invention differ somewhat in hardness. In the example, polyesterurethane A has a Shore hardness of 88 and polyesterurethane B, a Shore hardness of 70. In addition A has a higher molecular weight and is less soluble than B. 15% solutions in tetrahydrofuran have viscosities of 2350 cps. (A) and 360 cps. (B), Brookfield.

Example 1.—Cement for leather or vinyl uppers

|                     | Parts by weight |
|---------------------|-----------------|
| Tetrahydrofuran     | 79.55           |
| Polyesterurethane A | 3.07            |
| Polyesterurethane B | 17.38           |

The viscosity was 4000–5000 cps. at 25° C. using Brookfield RVF, #4 spindle at 4 r.p.m. Solids content was 20.45% by weight.

Example 2.—Cement for leather or vinyl soles

|                     | Parts by weight |
|---------------------|-----------------|
| Tetrahydrofuran     | 83.50           |
| Polyesterurethane A | 2.47            |
| Polyesterfurethane B| 14.03           |

The viscosity was 1500–1900 cps. at 25° C. using Brookfield RVF, #4 spindle at 4 r.p.m. Solids content was 16.50% by weight.

In Examples 1 and 2 the weight ratio of polyesterurethanes A and B can be varied from 100% B to about 20% A/80% B preferably the ratio is about 15% A/85% B.

The polyester-urethanes used are tough, essentially linear elastomers that are thermoplastic, extrudable, moldable, become molten at elevated temperatures, are substantially free of crosslinks, and are substantially soluble in dimethyl formamide. They are described in U.S. Patent 2,871,218 and comprise the reaction products obtained by heating a mixture comprising as essential polyesterurethane forming ingredients (a) one mole of an essentially linear hydroxyl-terminated polyester of a saturated aliphatic glycol having from 4 to 10 carbon atoms and having hydroxyl groups on its terminal carbon atoms and a material selected from the group consisting of a dicarboxylic acid of the formula

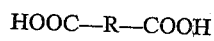

$$HOOC-R-COOH$$

where R is an alkylene radical containing from 2 to 8 carbon atoms and its anhydride, said polyester having an average molecular weight between 600 and 1200 and having an acid number less than 10, and (b) from about 1.1 to 3.1 moles of a diphenyl diisocyanate having an isocyanate group on each phenyl nucleus in the presence of (c) from about 0.1 to 2.1 moles of a saturated aliphatic free glycol containing from 4 to 10 carbon atoms and having hydroxyl groups on its terminal carbon atoms, the molar amount of said polyester and said free glycol combined being essentially equivalent to the molar amount of said diphenyl diisocyanate whereby there are essentially no unreacted groups of the class consisting of isocyanate and hydroxyl groups in said reaction product.

The polyesterurethanes may be made, for example, by melting a mixture of 1447 grams of hydroxyl poly (tetramethylene adipate) and 109.6 grams of butanediol-1,4 in a 4-liter kettle and stirring with a spiral ribbon stirrer for about 20 minutes at a pressure of 5 to 6 min. at 100 to 110° C. There is then added 730 grams of diphenyl methane-p,p'-diisocyanate. The mixture is stirred for about 1 minute and is then poured into a lubricated 1-gallon can that is promptly sealed with a friction top and heated in a 140° C. oven for 3½ hours. The hydroxyl poly (tetramethylene adipate) used has a molecular weight of 849, a hydroxyl number of 130.4 and an acid number of 0.89.

Another example is carried out by melting a mixture of 2323 grams of hydroxyl poly (tetramethylene adipate) and 219.52 grams of butanediol-1,4 in a heated autoclave and stirring for 15 minutes at 100 to 105° C. under 10 min. pressure. 1178.7 grams of diphenyl methane-p,p'-diisocyanate is added to this mixture, which is then stirred for 2 minutes and poured into polytetrafluoroethylene-lined metal trays and place in a 140° C. oven for 3 hours. At the end of this time the product is cooled. The hydroxyl poly-(tetramethylene adipate) used has a molecular weight of 1010 and a hydroxyl number of 106.1.

The viscosities of the cements may range from 500 to 10,000 cps., with the region of about 1500–5000 cps., being the most useful, as measured on the Brookfield RVF viscometer at 25° C. and 4 r.p.m. using the #4 spindle. Total solids in the cements are preferably 16.5 to 24.0% by weight, but may vary from about 10 to 30% by weight.

The cement to be applied to the vinyl surface should be a solution in tetrahydrofuran. Dimethylformamide or cyclohexanone penetrate the vinyl adequately, but are too slow in drying and have objectionable odors. The tetrahydrofuran in these "vinyl" cements may be diluted with up to about 19% of "Synasol," which is a stabilized 1,1,1-trichloroethane. When this mixed solvent is used, however, the viscosity is lowered for any given solids content. In some cases more solid must be dissolved to increase the viscosity, otherwise the extrusion properties are impaired. In Example 3, however, the blend with chlorinated rubber and epoxide resin permits the use of methyl ethyl ketone.

A combination that forms excellent bonds not only between vinyl and leather but also between vinyl and rubber or rubber composition may be made from a solution of polyesterurethane B and minor amounts of an epoxide resin and chlorinated natural rubber. Roughly speaking it is preferable to have about equal weight of epoxide and chlorinated rubber while their combined weights are preferably about one-half the weight of the polyesterurethane used. The preferred solvent is methyl ethyl ketone and a solids content of about 20% is preferable. This cement is used on the non-vinyl material in combination with one of the tetrahydrofuran vinyl cements.

*Example 3.—Cement for rubber or leather soles*

| | Percent |
|---|---|
| Methyl ethyl ketone | 79.00 |
| Polyesterurethane B | 14.00 |
| Chlorinated natural rubber | 3.50 |
| Epoxide resin ("Epon 1007") | 3.50 |

The viscosity of this composition is 3000 (±200) cps. at 25° C. with RVF Brookfield #3 spindle at 20 r.p.m.

A suitable cement for vinyl uppers to be used with the above sole cement is given in the following example.

*Example 4.—Cement for vinyl uppers*

| | Percent |
|---|---|
| Tetrahydrofuran | 79.00 |
| Polyesterurethane B | 21.00 |

The viscosity is 3000 (±200) cps. at 25° C. with RVF Brookfield #3 spindle at 20 r.p.m.

The shoe soles of leather, rubber or rubber composition are roughed or sanded lightly to remove any foreign material. Similarly the bottoms of the vinyl uppers are also roughened slightly. One coat of the appropriate cement is extruded on each part and the shoe joint made as described before.

Many commercial and experimental adhesives were tried for this type of bonding, but none gave results that even approached the all-round performance of the Example 3 type of cement. If the chlorinated rubber is omitted, the cement's cohesion is weakened so that the cement films distort too readily. The polyesterurethane B/epoxide resin combination displays excellent cementing qualities except for the cohesion, and this is true for weight ratios of at least from about 1/4 to about 3/4 of epoxide/polyesterurethane B. Addition of chlorinated natural rubber imparted excellent cohesion to the resulting cement film without impairing its other desirable characteristics. Compositions in which the amount of chlorinated rubber and epoxide resin was varied from 10 to 75% of the weight of polyesterurethane gave results as good as those given by commercial shoe cements, the rubber and epoxide being present in about equal amounts.

Suitable epoxide resins are the resinous products resulting from the reaction of epichlorohydrin and a bisphenol such as

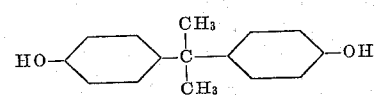

having molecular weights of about 900 to 4000 and melting points of about 64–135° C. "Epon 1007" is an epoxide resin that falls into this category; it has a molecular weight of 3200 to 3800 and a melting point of about 127–133° C.

Typical dead weight results are shown in the following table. The sole here was composition rubber and the upper was vinyl.

| Cement | Temp., °F. | Test Weight, lbs. | Creep |
|---|---|---|---|
| Neoprene W | 120 | 5 | 4″ in 5 mins. |
| Hycar 1001 | 120 | 5 | 4″ in ½ hour. |
| 1234 | 120 | 5 | No creep in 3 hours. |
| Neoprene W | 105 | 5 | 4″ in 15 mins. |
| Hycar 1001 | 105 | 5 | 2″ in 30 mins. |
| 1234 | 105 | 5 | No creep in 24 hours. |

"Neoprene" is a trade name for polymers of 2-chlorobutadiene.
"Hycar 1001" is a trade name for an acrylonitrile-butadiene copolymer having a high acrylonitrile content.
"1234" is a bond made from the sole cement of Example 3 and the upper cement of Example 4.

Within the meaning of the term "vinyl," as used herein, there is included polyvinyl chloride, polyvinylidene chloride, copolymers of vinyl chloride with vinylidene chloride, and copolymers of at least about 85% vinyl chloride and about 15% or less of vinyl acetate. It is understood that commercially available "vinyl" uppers and soles may contain various adjuvants notably conventional plasticizers and colorants. Such adjuvants are preferably not of the type that causes dermatitis.

The drawing shows diagrammatically an embodiment of the article of this invention in cross section.

What is claimed is:
1. An article of manufacture having cemented surfaces, one of the surfaces being that of a vinyl plastic, the other surface cemented thereto comprising a solid material composed of a major proportion of rubber, the cement being applied to said vinyl plastic before curing are consisting essentially of a 10–30% by weight solution of a polyesterurethane that is a tough, essentially linear elastomer, thermoplastic, extrudable, moldable, and becomes molten at elevated temperatures, is substantially free of crosslinks, substantially soluble in dimethyl formamide, and comprises the reaction product obtained by heating a mixture comprising, as essential polyesterurethane-forming ingredients

(a) one mole of an essentially linear hydroxyl-terminated polyester of a saturated aliphatic glycol having from 4 to 10 carbon atoms and having hydroxyl groups on its terminal carbon atoms and a material selected from the group consisting of a dicarboxylic acid of the formula

HOOC—R—COOH where R is an alkylene radical containing from 2 to 8 carbon atoms and its anhydride, said polyester having an average molecular weight between 600 and 1200 and having an acid number less than 10 and (b) from about 1.1 to 3.1 moles of a diphenyl diisocyanate having an isocyanate group on each phenyl nucleus in the presence of (c) from about 0.1 to 2.1 moles of a saturated aliphatic free glycol containing from 4 to 10 carbon atoms and having hydroxyl groups on its terminal carbon atoms, the molar amount of said polyester and said free glycol combined being essentially equivalent to the molar amount of said diphenyl diisocyanate whereby there are essentially no unreacted groups of the class consisting of isocyanate and hydroxyl groups in said reaction product, and the cement applied to said solid material composed of a major proportion of rubber being a cement consisting essentially of a 10–30% by weight solution of 90–25% by weight of the same polyesterurethane as described above and correspondingly 10–75% by weight of chlorinated natural rubber and an epoxide resin, the chlorinated rubber and the epoxide resin being present in approximately equal amounts by weight, and the epoxide resin being a resinous product resulting from the reaction of epichlorohydrin and a bisphenol such as

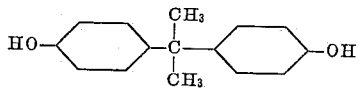

said resinous product having a molecular weight of from about 900 to about 4000 and a melting point of from about 64° C. to about 135° C.

2. A shoe, as the article of manufacture described in claim 1, further characterized in having tetrahydrofuran as the solvent in the cement applied to the vinyl plastic and in having methyl ethyl ketone as the solvent in the cement applied to the solid material composed of a major proportion of rubber.

3. A shoe as described in claim 2, further characterized in having a vinyl plastic upper and a sole which is a solid material composed of a major proportion of rubber, the vinyl plastic cement, before curing, having a polyesterurethane content of about 20% by weight and having a viscosity of about 3000 cps., as measured with RVF Brookfield spindle #3 at 20 r.p.m. and 25° C., and the shoe sole cement, before curing, having a solid content of about 20% by weight and having a viscosity similar to that of the said vinyl plastic cement, the solids in the shoe sole cement consisting essentially of 13⅓ parts by weight of said polyesterurethane, 3⅓ parts by weight of chlorinated natural rubber, and 3⅓ parts by weight of said epoxide resin, the latter being further characterized by having a molecular weight of from about 3200 to about 3800 and a melting point of from about 127° C. to about 133° C.

4. The method of cementing vinyl plastic shoe uppers to shoe soles comprised of a major proportion of rubber, comprising
(a) roughening the surfaces to be cemented,
(b) applying to the roughened surface of the vinyl plastic shoe upper a cement which, before curing, consists essentially of a 10–30% by weight solution of a polyesterurethane that is a tough, essentially linear elastomer, thermoplastic, extrudable, moldable, and becomes molten at elevated temperatures, is substantially free of crosslinks, substantially soluble in dimethyl formamide, and comprises the reaction product obtained by heating a mixture comprising, as essential polyesterurethane forming ingredients,
(A) one mole of an essentially linear hydroxyl-terminated polyester of a saturated aliphatic glycol having from 4 to 10 carbon atoms and having hydroxyl groups on its terminal carbon atoms and a material selected from the group consisting of a dicarboxylic acid of the formula

HOOC—R—COOH where R is an alkylene radical containing from 2 to 8 carbon atoms and its anhydride, said polyester having an average molecular weight between 600 and 1200 and having an acid number less than 10 and
(B) from about 1.1 to 3.1 moles of a dihpenyl diisocyanate having an isocyanate group on each phenyl nucleus in the presence of
(C) from about 0.1 to 2.1 moles of a saturated aliphatic free glycol containing from 4 to 10 carbon atoms and having hydroxyl groups on its terminal carbon atoms, the molar amount of said polyester and said free glycol combined being essentially equivalent to the molar amount of said diphenyl diisocyanate whereby there are essentially no unreacted groups of the class consisting of isocyanate and hydroxyl groups in said reaction product,
(c) applying to the roughened surface of the shoe sole a cement consisting essentially of a 10–30% by weight solution of 90–25% by weight of the same polyesterurethane described under (B) and, correspondingly, 10–75% by weight of chlorinated natural rubber and an epoxide resin, the chlorinated rubber and the epoxide resin being present in approximately equal amounts by weight, the epoxide resin being a resinous product resulting from the reaction of epichlorohydrin and a bisphenol such as

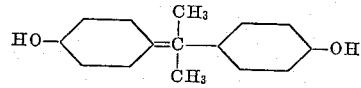

said resinous product having a molecular weight of from about 900 to about 4000 and a melting point of from about 64° C. to about 135° C,
(d) drying the cement for about 2 hours,
(e) heating the cement-bearing parts at about 110 to 160° F. for about 15–45 seconds,
(f) bringing the appropriate cement-bearing parts into suitable intimate contact,
(g) subjecting the cemented joints to a pressure of about 4 0to 60 pounds per square inch for period of about 10 to 45 seconds, and
(h) allowing the completed shoe to cool.

5. The method described in claim 4 wherein the cement defined in (b) is dissolved in tetrahydrofuran and the cement defined in (c) is dissolved in methyl ethyl ketone.

6. The method described in claim 5 wherein the cement described under (b) has a polyesterurethane content of about 20% by weight and has a viscosity of about 3000 cps., as measured with RVF Brookfield spindle #3 at 20 r.p.m. and 25° C., and the cement described under (c) has a solid content of about 20% by weight and has a viscosity similar to that of the cement described under (b), the solids in the (c) cement consisting essentially of 13⅓ parts by weight of the polyesterurethane, 3⅓ parts by weight of chlorinated natural rubber, and 3⅓ parts by weight of the epoxide resin, the latter being further characterized by having a molecular weight of from about 3200 to about 3800 and a melting point of from about 127° C. to about 133° C.

References Cited by the Examiner

UNITED STATES PATENTS 3,032,460   5/1962   Chipman et al. _____ 156—310 X
3,161,898   12/1964  Broomfield et al. _____ 12—1
3,177,597   4/1965   Davis et al. _____ 36—19.5

JORDAN FRANKLIN, *Primary Examiner.*

H. H. HUNTER, *Assistant Examiner.*

UNITED STATES PATENT OFFICE
CERTIFICATE OF CORRECTION

Patent No. 3,315,380                          April 25, 1967

Edward C. Mack III et al.

It is hereby certified that error appears in the above numbered patent requiring correction and that the said Letters Patent should read as corrected below.

Column 1, line 21, for "so" read -- some --; line 50, for "out" read -- ought --; column 2, line 5, for "Polyesterfurethanes" read -- Polyesterurethanes --; line 13, for "polyester-urethanes" read -- polyesterurethanes --; column 4, line 44, for "are" read -- and --; column 6, line 3, for "dihpenyl" read -- diphenyl --; line 39, for "4 0to" read -- 40 to --; same line 39, after "for" insert -- a --.

Signed and sealed this 14th day of November 1967.

(SEAL)
Attest:

Edward M. Fletcher, Jr.

Attesting Officer

EDWARD J. BRENNER

Commissioner of Patents